United States Patent Office 3,636,047
Patented Jan. 18, 1972

3,636,047
KETONE DERIVATIVES OF 1,4-BENZODITHIAN
AND 1,4-BENZOXATHIAN
Michel Tobias, Edison, N.J., assignor to
Mobil Oil Corporation
No Drawing. Filed Nov. 29, 1968, Ser. No. 780,185
Int. Cl. C07d 13/00, 89/14
U.S. Cl. 260—327 P
4 Claims

ABSTRACT OF THE DISCLOSURE 5,6,7,8 - tetrahydro - 8 - oxo - 1,4 - benzodithian and 5,6,7,8 - tetrahydro - 8 - oxo - 1,4 - benzoxathian are prepared by base-catalyzed reaction of 2 - halo - 2 - cyclohexen - 1 - one or 2,3-epoxycyclohexanone with a dimercaptoalkane or a mercaptoalcohol. They are dehydrogenated to the corresponding phenol and converted to N-methylcarbamates, which have insecticidal activity.

BACKGROUND OF THE INVENTION

Field of the invention

This invention is directed to condensed ring heterocyclic compounds. It is more particularly concerned with ketones, phenols, and carbamates of 1,4-benzodithian and 1,4-benzoxathian and the use of the carbamates as biocides.

Description of the prior art

Insofar as is now known, the compounds of this invention have not been described in the prior art.

SUMMARY OF THE INVENTION

This invention provides 5,6,7,8 - tetrahydro - 8 - oxo - 1,4 - benzodithians and 5,6,7,8 - tetrahydro - 8 - oxo - 1,4 - benzoxathians and their corresponding phenols and N-methylcarbamates thereof having the formulae:

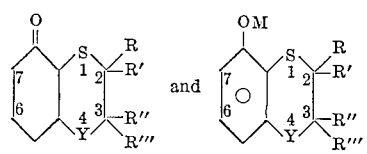

wherein Y is O or S; R, R', R", and R''' are hydrogen, methyl, or ethyl; and M is hydrogen or

This invention also provides a process for producing the 5,6,7,8 - tetrahydro - 8 - oxo - 1,4 - benzodithians and the 5,6,7,8 - tetrahydro - 8 - oxo - 1,4 - benzoxathians that comprises reacting 2,3 - epoxycyclohexanone, 2-bromo - 2 - cyclohexen - 1 - one, or 2 - chloro - 2 - cyclohexen - 1 - one with a thiol having the formula:

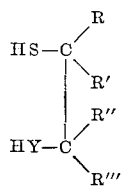

wherein Y, R, R', R", and R''' are as aforedefined, in the presence of a basic catalyst.

This invention further provides a method for controlling insects that comprises contacting them with at least one of the aforedescribed N-methylcarbamates and an insecticidal composition comprising at least one of the aforedescribed N-methylcarbamates and a carrier thereof.

DESCRIPTION OF SPECIFIC EMBODIMENTS

The 5,6,7,8 - tetrahydro - 8 - oxo - 1,4 - benzodithians and 5,6,7,8 - tetrahydro - 8 - oxo - 1,4 - benzoxathians of this invention are readily prepared by the base-catalyzed reaction of 2,3-epoxycyclohexanone or of 2-bromo- (or 2-chloro-) - 2 - cyclohexen - 1 - one with an alkanedithiol or a mercaptoalcohol. The cyclic ketone reactants can be prepared by any of the methods fully described in the literature.

2,3-epoxycyclohexanone is produced by reacting 2-cyclohexen - 1 - one with hydrogen peroxide, such as described in J. Prackt. Chem, 111, 373 (1925). 2-chloro-2-cyclohexen-1-one can be produced by adding chlorine across the double bond to give 2,3-dichlorocyclohexanone, followed by dehydrochlorination to yield the 2-chloro-2-cyclohexen-1-one. Similarly, using bromine instead of chlorine, the 2-bromo-2-cyclohexen-1-one can be prepared.

The "thiol reactants," as used herein, are alkanedithiols and mercaptoalcohols (mercaptoalkanols) in which the two thiol groups or the mercapto and hydroxyl groups are on adjacent carbon atoms of an alkane. The alkanedithiols are readily prepared by reacting the corresponding dichloro- or dibromoalkane with sodium mercaptide. Typical alkanedithiols are ethanedithiol; propanedithiol; 1,2-butanedithiol; 2,3-butanedithiol; 2,3-dimethyl-2,3-butanedithiol; 2 - ethyl - 1,2 - butanedithiol; 2,3 - pentanedithiol; and 3,4-hexanedithiol.

The mercaptoalkanols can be prepared by methods well known in the art and many are commercially available. Typical mercaptoalkanols are mercaptoethanol; 2-mercapto1-propanol; and 1-mercapto-2-butanol; 2-mercapto-2-butanol.

As mentioned hereinbefore, the reaction between the cyclic ketone reactant and the thiol reactant is carried out in the presence of a basic catalyst. Suitable catalysts include inorganic bases, such as sodium hydroxide and potassium hydroxide; amines, such as triethylamine and organic bases, such as benzyltrimethylammonium methoxide, benzyltrimethylammonium hydroxide, and sodium alkoxide.

The reaction is preferably carried out in polar solvents, such as methanol, dimethoxymethane, acetonitrile, and chloroform. Preferably, a solution of an equimolar mixture of the reactants is slowly added to a solution of the catalyst. The reaction is exothermic and temperature should be controlled to about 50° C. or lower. Typical manipulations and product isolation techniques are demonstrated in the specific working examples.

Non-limiting examples of the compounds produced as aforedescribed are 5,6,7,8-tetrahydro-8-oxo-1,4-benzodithian;
5,6,7,8-tetrahydro-2-methyl-8-oxo-1,4-benzodithian;
5,6,7,8-tetrahydro-3-methyl-8-oxo-1,4-benzodithian;
5,6,7,8-tetrahydro-2-ethyl-8-oxo-1,4-benzodithian;
5,6,7,8-tetrahydro-3-ethyl-8-oxo-1,4-benzodithian;
5,6,7,8-tetrahydro-2,2-dimethyl-8-oxo-1,4-benzodithian;
5,6,7,8-tetrahydro-2-ethyl-3-methyl-8-oxo-1,4-benzodithian;
5,6,7,8-tetrahydro-2,2,3,3-tetramethyl-8-oxo-1,4-benzodithian;
5,6,7,8-tetrahydro-8-oxo-1,4-benzoxathian;
5,6,7,8-tetrahydro-2-methyl-8-oxo-1,4-benzoxathian;
5,6,7,8-tetrahydro-3-methyl-8-oxo-1,4-benzoxathian;
5,6,7,8-tetrahydro-2-ethyl-8-oxo-1,4-benzoxathian;
5,6,7,8-tetrahydro-3-ethyl-8-oxo-1,4-benzoxathian;
5,6,7,8-tetrahydro-3,3,-dimethyl-8-oxo-1,4-benzoxathian;
5,6,7,8-tetrahydro-2-methyl-3-ethyl-8-oxo-1,4-benzoxathian; and
5,6,7,8-tetrahydro-2,2,3,3-tetramethyl-8-oxo-1,4-benzoxathian.

The aforedescribed oxo compounds can be converted to the hydroxy (phenol) derivative by dehydrogenation in the liquid or vapor phase, using methods well known in the art. The procedure described in U.S. Pat. No. 3,317,552, was found effective.

Non-limiting examples of the hydroxy derivatives of the aforedescribed oxo compounds are:

8-hydroxy-1,4-benzodithian;
2-methyl-8-hydroxy-1,4-benzodithian;
3-methyl-8-hydroxy-1,4-benzodithian;
2-ethyl-8-hydroxy-1,4-benzodithian;
3-ethyl-8-hydroxy-1,4-benzodithian;
2,2-dimethyl-8-hydroxy-1,4-benzodithian;
2-ethyl-3-methyl-8-hydroxy-1,4-benzodithian;
2,2,3,3-tetramethyl-8-hydroxy-1,4-benzodithian;
8-hydroxy-1,4-benzoxathian;
2-methyl-8-hydroxy-1,4-benzoxathian;
2-ethyl-8-hydroxy-1,4-benzoxathian;
3-ethyl-8-hydroxy-1,4-benzoxathian;
3,3-dimethyl-8-hydroxy-1,4-benzoxathian; and
2,2,3,3-tetramethyl-8-hydroxy-1,4-benzoxathian;
8-hydroxy-1,4-benzoxathian;
2-methyl-8-hydroxy-1,4-benzoxathian;
3-methyl-8-hydroxy-1,4-benzoxathian;
2-ethyl-8-hydroxy-1,4-benzoxathian;
3-ethyl-8-hydroxy-1,4-benzoxathian;
3,3-dimethyl-8-hydroxy-1,4-benzoxathian;
2-methyl-3-ethyl-8-hydroxy-1,4-benzoxathian; and
2,2,3,3-tetramethyl-8-hydroxy-1,4-benzoxathian.

The insecticidal carbamates of this invention are prepared by any of the well known methods for converting hydroxy compounds to carbamates. A feasible procedure is to react the hydroxy compound with methyl isocyanate. Another procedure is to react the hydroxy compound with phosgene to form a chloroformate which is then reacted with methylamine. These procedures and the conditions involved can be found in U.S. Pats. Nos. 3,288,673 and 3,288,808.

Non-limiting examples of the insecticidal carbamates of the aforedescribed hydroxy compounds are:

8-(1,4-benzodithianyl)-N-methylcarbamate;
2-methyl-8-(1,4-benzodithianyl)-N-methylcarbamate;
3-methyl-8-(1,4-benzodithianyl)-N-methylcarbamate;
2-ethyl-8-(1,4-benzodithianyl)-N-methylcarbamate;
3-ethyl-8-(1,4-benzodithianyl)-N-methylcarbamate;
2,2-dimethyl-8-(1,4-benzodithianyl)-N-methylcarbamate;
2-ethyl-3-methyl-8-(1,4-benzodithianyl)-N-methylcarbamate;
2,2,3,3-tetramethyl-8-(1,4-benzodithianyl)-N-methylcarbamate;
8-(1,4-benzoxathianyl)-N-methylcarbamate;
2-methyl-8-(1,4-benzoxathianyl)-N-methylcarbamate;
3-methyl-8-(1,4-benzoxathianyl)-N-methylcarbamate;
2-ethyl-8-(1,4-benzoxathianyl)-N-methylcarbamate;
3-ethyl-8-(1,4-benzoxathianyl)-N-methylcarbamate;
3,3-dimethyl-8-(1,4-benzoxathianyl)-N-methylcarbamate;
2-methyl-3-ethyl-8-(1,4-benzoxathianyl)-N-methylcarbamate; and
2,2,3,3-tetramethyl-8-(1,4-benzoxathianyl)-N-methylcarbamate.

The N-methylcarbamates of this invention have been found to exhibit considerable biological activity and are potent insecticides when used against important agricultural pests. These compounds may be used in various ways to achieve biological action. They can be applied per se, as solids or in vaporized form, but are preferably applied as the toxic components in pesticidal compositions of the compound and a carrier. The compositions can be applied as dusts, as liquid sprays, or as gas-propelled sprays and can contain, in addition to a carrier, additives such as emulsifying agents, wetting agents, binding agents, gases compressed to the liquid state, odorants, stabilizers, and the like. A wide variety of liquid and solid carriers can be used in the pesticidal compositions. Non-limiting examples of liquid carriers include water; organic solvents such as alcohols, ketones, amides, esters; mineral oils such as kerosene, light oils, medium oils; and vegetable oils such as cottonseed oil. Non-limiting examples of solid carriers include talc, bentonite, diatomaceous earth, pyrophyllite, fullers earth, gypsum, flours derived from cotton seeds and nut shells, and various natural and synthetic clays having a pH not exceeding about 9.5.

The amount of the N-methylcarbamate compounds of this invention utilized in pesticidal compositions will vary rather widely. It depends to some extent upon the type of composition in which the material is being used, the nature of the condition to be controlled, and the method of application (i.e., spraying, dusting, etc.). In the ultimate pesticidal composition, as applied in the field, pesticide concentrations as low as 0.0001 weight percent of the total composition can be used. In general, compositions, as applied, containing about 0.05 weight percent pesticide in either liquid or solid carrier give excellent results. In some cases, however, stronger dosages up to about 10 weight percent may be required.

In practice, pesticidal compositions are usually prepared in the form of concentrates, which are diluted in the field to the concentration desired for application. For example, the concentrate can be a wettable powder containing large amounts of a compound of this invention, a carrier (e.g., attapulgite or other clay), and wetting and dispersing agents. Such powders can be diluted prior to application, by dispersing in water to obtain a sprayable suspension containing the concentration of pesticide desired for application. Other concentrates can be solutions that can be later diluted, e.g., with kerosene. Thus, it is within the contemplation of this invention to provide pesticidal compositions containing up to about 80 percent, by weight of the composition, of a pesticidal compound of this invention. Accordingly, depending upon whether it is ready for application or it is in concentrated form, the contemplated pesticidal compositions contain about between 0.0001 percent and about 80 percent, by weight of the composition, of a pesticidal compound of this invention and a carrier, liquid or solid, as defined hereinbefore.

EXAMPLE 1

Five and six-tenths gram (0.05 mole) of 2,3-epoxycyclohexanone and 4.7 g. (0.05 mole) of 1,2-ethanedithiol were each placed in 5 ml. of methanol and added dropwise to a solution of 5 drops of 15% sodium hydroxide, 20 ml. of dimethoxyethane and 5 ml. of methanol. Addition was completed in 30 minutes, while the temperature of the reaction was maintained at 50° C. After standing for 36 hours at room temperature, 7.6 g. of 5,6,7,8-tetrahydro-8-oxo-1,4-benzodithian was filtered from the reaction, M.P. 183–185° C. after several recrystallizations from acetone.

EXAMPLE 2

Seven grams (0.037 mole) of 5,6,7,8-tetrahydro-8-oxo-1,4-benzodithian, 2.4 g. (0.074 mole) of sulfur and 60 ml. of diphenyl ether were heated together at 245–255° C. for 2 hours. After cooling, the reaction mixture was diluted with ether and then extracted with dilute sodium hydroxide solution. Acidification of the basic extracts yielded 7.0 g. of dark oil which upon distillation yielded 2.7 g. of 8-hydroxy-1,4-benzodithian, B.P. 134–137° (2 mm.). The phenol slowly crystallized upon standing to a yellow solid, M.P. 59–63° C.

EXAMPLE 3

Two and two-tenths grams (0.012 mole) of 8-hydroxy-1,4-benzodithian and 1.1 g. (0.02 mole) of methyl isocyanate were placed in 20 ml. of benzene containing 2 drops of dibutyltin diacetate, and allowed to stand for 5 days at room temperature. Addition of petroleum ether to the benzene solution precipitated 2.2 g. of 8-(1,4-benzodithianyl)-N-methylcarbamate, M.P. 125–135° C. after 1 recrystallization from ethyl acetate.

EXAMPLE 4

Five and six-tenths grams (0.05 mole) of 2,3-epoxycyclohexanone and 3.9 g. (0.05 mole) of 2-mercaptoethanol were each placed in 5 ml. of dimethoxyethane and added dropwise to 25 ml. of acetonitrile containing 6 drops of a 40% methanolic solution of benzyltrimethylammonium methoxide. The temperature of the exothermic reaction was not allowed to rise above 45° C. After standing overnight at room temperature, the solvent was removed at reduced pressure. Distillation of the residue yielded 5.9 g. of an oil, B.P. 129–134° (2 mm.) which slowly crystallized to 5,6,7,8-tetrahydro-8-oxo-1,4-benzoxathian upon standing, M.P. 106–108° C. after recrystallization from petroleum ether-ether.

EXAMPLE 5

Five and five-tenths grams (0.032 mole) of 5,6,7,8-tetrahydro-8-oxo-1,4-benzoxathian, 2.05 g. (0.064 mole) of sulfur and 60 ml. of diphenyl ether were heated together at 245–255° C. for 3 hours. At this point the reaction mixture was worked-up in the same manner as was described in Example 2. Distillation of the crude reaction products yielded 0.8 g. of 8-hydroxy-1,4-benzoxathian, B.P. 121–124° C. (2 mm.).

EXAMPLE 6

Eight tenths gram (0.005 mole) of 8-hydroxy-1,4-benzoxathian and 0.85 g. (0.015 mole) of methyl isocyanate were placed in 10 ml. of benzene containing 2 drops of dibutyltin diacetate, and allowed to stand at room temperature for 3½ days. Dilution of the benzene solution with petroleum ether yielded 1.0 g. of 8-(1,4-benzoxathianyl)-N-methylcarbamate, which failed to crystallize upon standing.

EXAMPLE 7

Fourteen and four-tenths grams (0.082 mole) of 2-bromo-2-cyclohexen-1-one and 10.0 g. (0.082 mole) of 1,2-butanedithiol were each placed in 15 ml. of chloroform and added dropwise to 70 ml. of chloroform containing 9.1 g. (0.09 mole) of triethylamine. The simultaneous addition of reactants was complete in 80 minutes. The temperature of the exothermic reaction was not allowed to rise above 40° C. After standing overnight at ambient temperature, the reaction mixture was heated at reflux for 3 hours. After cooling, the reaction mixture was washed with water, saturated brine, and dried over magnesium sulphate. Distillation yielded 8.5 g. of 5,6,7,8-tetrahydro-2-ethyl-8-oxo-1,4-benzodithian, B.P. 138–144° C. (0.03 mm.).

EXAMPLE 8

Five and seven-tenths grams (0.027 mole) of 5,6,7,8-tetrahydro-2-ethyl-8-oxo-1,4-benzodithian, 1.75 g. of sulfur (0.054 mole) and 60 ml. of diphenyl ether were heated together at 245–255° C. for 2.5 hours. The reaction was worked-up in the same manner as described in Example 2. Distillation yielded 1.7 g. of 2-ethyl-8-hydroxy-1,4-benzodithian, B.P. 137–139° C. (2 mm.).

EXAMPLE 9

One and two-tenths grams (0.006 mole) of 2-ethyl-8-hydroxy-1,4-benzodithian and 0.8 g. of (0.014 mole) of methyl isocyanate were placed in 15 ml. of benzene containing 2 drops of dibutyltin diacetate and allowed to stand for 4½ days at room temperature. Dilution of the benzene solution yielded 1.2 g. of 2-ethyl-8-(1,4-benzodithianyl)-N-methylcarbamate, which failed to crystallize on standing.

The compounds of Examples 3, 6, and 9 were subjected to the following insecticide tests. The results were set forth in the table as percent control at 500 p.p.m., following the test descriptions.

INSECTICIDE TESTING METHODS

Dip test

Mexican bean beetle: *Epilachna varivestis* Mulsant.— Lima bean leaves of uniform size are momentarily dipped in a 500 p.p.m. water-acetone solution of the test compound. When dry, the treated leaf is placed in a screened petri dish and exposed to 10 fourth instar larvae. The percent mortality is recorded after forty-eight hours. Compounds that show 90 percent or more mortality are retested at 100 and 10 p.p.m.

Southern armyworm: *Prodenia eridania* Cramer.— This test is carried out as described for the Mexican bean beetle, using 10 fourth instar larvae and observing mortality after 48 hours.

Two-spotted spider mite: *Tetranychus telarius* Linnaeus.—Infested trifoliate bean leaves (Henderson bush lims) are selected that have as many as twenty adult mites per leaf. Leaves with mites attached are momentarily dipped into a 500 p.p.m. emulsion, solution, or suspension of the test compounds and then placed (petiole only) in a 4 oz. bottle of water for observation. Percent mortality is observed after 72 hours. If 90–100 percent mortality is observed, compounds are retested at 100 and 10 p.p.m.

Spray tests

Housefly: *Musca domestica* Linnaeus.—Adult houseflies are contained in 100 mm. petri dish screened cages and exposed to a spray of 10 ml. acetone solution of test compound. An initial concentration of 500 p.p.m. is used, with ten flies in each cage. Percent mortality is observed after 24 hours. When over 90 percent mortality is observed, the compound is retested at the lower concentrations.

Bean aphid: *Aphis fabae*.—This test is conducted in a manner similar to that used for the housefly. The test specimens are nasturtium leaves infested with bean aphids.

Boll weevil: *Anthonomus Grandis*.—This test is conducted in a manner similar to that used for the housefly. The test specimens are ten boll weevils per screened petri dish.

Mosquito larvae: *Aedes aegypti* Linnaeus.—Early fourth stage larvae are exposed to solutions, emulsions or suspensions of the test compound in water. The compounds are dissolved in acetone and added to jars of distilled water containing the larvae. Water-soluble compounds remain in solutions and the others form finely divided suspensions. Compounds are initially tested at one p.p.m. using ten larvae per 100 ml. water. Percent of mortality is observed after 24 hours. If 90–100 percent mortality occurs, compounds are retested at 0.1 and 0.01 p.p.m. Results are reported: p.p.m. conc./percent kill.

TABLE

| Compound of Example | Mexican bean beetle | Southern armyworm | Spider mite | Housefly | Bean aphid | Boll weevil | Mosquito larvae |
|---|---|---|---|---|---|---|---|
| 3 | 100 | 0 | 30 | 20 | 90 | 100 | 100 |
| 6 | 100 | 40 | 60 | 0 | 100 | 100 | 100 |
| 9 | 60 | 0 | 30 | 0 | 100 | 0 | 100 |

Although the present invention has been described with preferred embodiments, it is to be understood that modifications and variations may be resorted to, without departing from the spirit and scope of this invention as those skilled in the art will readily understand. Such variations and modifications are considered to be within the purview and scope of the appended claims.

What is claimed is:

1. 5,6,7,8-tetrahydro-8-oxo-1,4-benzodithian and 5,6,7,8-tetrahydro-8-oxo-1,4-benzoxathian having the formula:

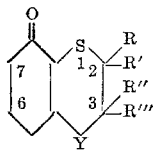

wherein Y is O or S; R, R', R'', and R''' are hydrogen, methyl, or ethyl.

2. 5,6,7,8-tetrahydro-8-oxo-1,4-benzodithian.
3. 5,6,7,8-tetrahydro-8-oxo-1,4-benzoxathian.
4. 5,6,7,8-tetrahydro-2-ethyl-8-oxo-1,4-benzodithian.

References Cited

UNITED STATES PATENTS

| | | | |
|---|---|---|---|
| 3,455,912 | 7/1969 | Eitel et al. | 260—340.3 |
| 3,185,692 | 5/1965 | Judd | 260—268 |
| 2,864,826 | 12/1958 | Diveley | 260—327 |

OTHER REFERENCES

Lowy, et al.: Int. Org. Chem., New York, 1945, pp. 213–5.

Reid: Org. Chem. of Bivalent S, Chem. Pub. Co., New York, 1960, vol. II, pp. 35, 36, 212–9.

HENRY R. JILES, Primary Examiner

C. M. SHURKO, Assistant Examiner

U.S. Cl. X.R.

424—276, 277

UNITED STATES PATENT OFFICE
CERTIFICATE OF CORRECTION

Patent No. 3636047  Dated January 18, 1972

Inventor(s) Michael A. Tobias

It is certified that error appears in the above-identified patent and that said Letters Patent are hereby corrected as shown below:

Column 1, line # 40, "  " should be

-- 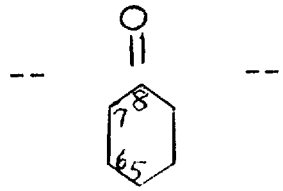 --

Column 7, line # 13-15, " 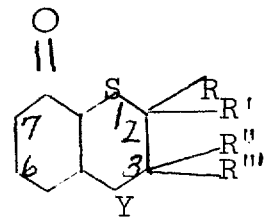 "

should be -- 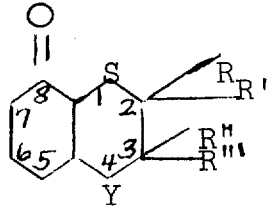 --

Signed and sealed this 29th day of August 1972.

(SEAL)
Attest:

EDWARD M. FLETCHER, JR.          ROBERT GOTTSCHALK
Attesting Officer                Commissioner of Patents